(12) United States Patent
Hartman et al.

(10) Patent No.: US 10,794,515 B2
(45) Date of Patent: Oct. 6, 2020

(54) VALVE OR PIPE DISCHARGE WITH VELOCITY REDUCTION DISCHARGE PLATE

(71) Applicants: Thomas A. Hartman, St. Louis, MO (US); Brian T. Hartman, Mesa, AZ (US); Catherine A. Hartman, Mesa, AZ (US)

(72) Inventors: Thomas A. Hartman, St. Louis, MO (US); Brian T. Hartman, Mesa, AZ (US); Catherine A. Hartman, Mesa, AZ (US)

( * ) Notice: Subject to any disclaimer, the term of this patent is extended or adjusted under 35 U.S.C. 154(b) by 133 days.

(21) Appl. No.: 16/205,408

(22) Filed: Nov. 30, 2018

(65) Prior Publication Data

US 2019/0186652 A1  Jun. 20, 2019

Related U.S. Application Data

(60) Provisional application No. 62/598,709, filed on Dec. 14, 2017.

(51) Int. Cl.
| | |
|---|---|
| *F16K 47/08* | (2006.01) |
| *F15D 1/02* | (2006.01) |
| *F15D 1/00* | (2006.01) |
| *F16L 55/027* | (2006.01) |

(52) U.S. Cl.
CPC ............... *F16K 47/08* (2013.01); *F15D 1/00* (2013.01); *F15D 1/025* (2013.01); *F16L 55/02718* (2013.01)

(58) Field of Classification Search
CPC .. F16K 47/08; F15D 1/00; F15D 1/025; F15D 1/08; F16L 55/02718
USPC ........................ 251/118–127; 138/37, 39–45
See application file for complete search history.

(56) References Cited

U.S. PATENT DOCUMENTS

| | | | |
|---|---|---|---|
| 621,480 A | 3/1899 | Stevens | |
| 1,663,998 A * | 3/1928 | Schmidt ................ | F04D 29/428 415/204 |
| 1,968,348 A | 7/1934 | Placide | |
| 2,486,297 A | 10/1949 | Lederer | |
| 2,717,614 A | 9/1955 | Palivos | |
| 2,797,906 A | 7/1957 | Aghnides | |
| 2,812,168 A | 11/1957 | Kumpman | |
| 2,842,347 A | 7/1958 | Ripley, Jr. | |
| 3,978,891 A * | 9/1976 | Vick .......................... | F16K 3/34 138/42 |
| 4,244,440 A * | 1/1981 | Matta ................... | G10K 11/161 181/213 |

(Continued)

*Primary Examiner* — John Bastianelli
(74) *Attorney, Agent, or Firm* — Thompson Coburn LLP

(57) ABSTRACT

A discharge for a fluid system has an inlet and an outlet in which a fluid flows from the discharge inlet to the discharge outlet. The discharge inlet has a inlet cross-sectional area. The discharge outlet has a plate. The plate has a plurality of radially extending ribs. The radially extending ribs are equiangularly spaced about a center axis of the plate. The radially extending ribs define a plurality of radially extending slots between the equiangularly spaced apart ribs. The radially extending ribs are dimensioned such that a sum of an area of all of the radially extending slots is greater than the discharge inlet cross-sectional area. When the fluid flows through the plate slots from the discharge outlet, it has a discharge coefficient of greater than 0.4.

20 Claims, 5 Drawing Sheets

(56) References Cited

U.S. PATENT DOCUMENTS

| | | | | |
|---|---|---|---|---|
| 5,295,397 | A | * | 3/1994 | Hall ........................ G01F 1/363 |
| | | | | 137/44 |
| 5,758,614 | A | * | 6/1998 | Choi ........................ F02D 9/104 |
| | | | | 123/184.53 |
| 5,921,476 | A | | 7/1999 | Akin et al. |
| 7,051,765 | B1 | * | 5/2006 | Kelley ..................... F15D 1/02 |
| | | | | 138/40 |
| 7,086,498 | B2 | * | 8/2006 | Choi ........................ F01N 1/083 |
| | | | | 181/270 |
| 7,299,997 | B2 | | 11/2007 | Sayar |
| D661,784 | S | | 6/2012 | Joss |
| 8,245,727 | B2 | * | 8/2012 | Mooney ................... F16K 7/14 |
| | | | | 137/625.33 |
| 8,307,943 | B2 | * | 11/2012 | Klasing ................... F02K 3/075 |
| | | | | 138/40 |
| 8,608,089 | B2 | | 12/2013 | Wilson et al. |

\* cited by examiner

US 10,794,515 B2

VALVE OR PIPE DISCHARGE WITH VELOCITY REDUCTION DISCHARGE PLATE

RELATED APPLICATION DATA

This application claims the benefit of provisional application Ser. No. 62/598,709, filed Dec. 14, 2017, the disclosure of which is incorporated by reference herein.

BACKGROUND

In general, the free fluid discharge from a valve has a constantly changing diameter, shape, and degree of aeration as the control point (e.g., the position of the valve body of the valve) moves from closed to open. A fixed cone valve when fully open produces a fluid discharge that is constant changing diameter (i.e., conically shaped) jet of water. The optimum shape of free fluid discharge is a horizontal blended cylindrical column of aerated water of a constant diameter that changes in downstream vertical drop and in length of distance traveled based upon the discharge volume and velocity. A velocity reduction discharge plate as set forth in the description that follows provides optimum conditions for free fluid discharge.

DETAILED DESCRIPTION

Figure 1:
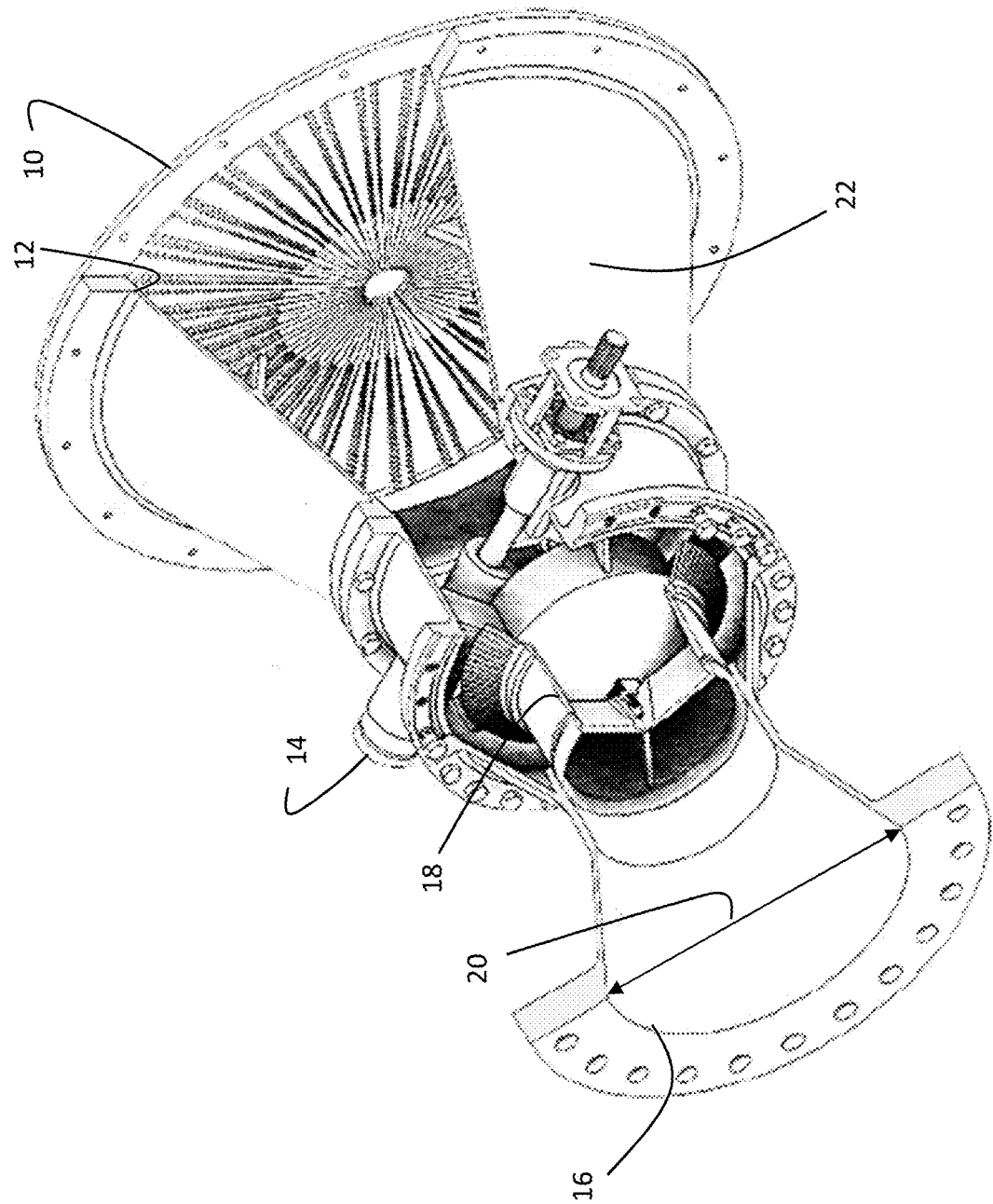
FIG. 1 shows a perspective view of an exemplary valve with a portion cut-away to show internal features of the valve and an embodiment of a velocity reduction discharge plate.

FIG. 1 shows an exemplary velocity reduction discharge plate 10 attached to an outlet 12 of a valve 14. The valve 14 may be an axial flow sleeve valve. For instance, the axial flow sleeve valve may be of the type disclosed in co-pending application Ser. No. 15/617,552, the disclosure of which is incorporated by reference herein. The valve 14 may have an inlet 16 opposite the outlet 12 with a valve body 18 disposed within the valve. The valve body 18 may be movable within the valve 14 between an open position in which fluid flows from the inlet to the outlet and a closed position in which the valve body blocks fluid from flowing from the inlet to the outlet. The valve inlet 16 may have an inlet cross-sectional area 20. The valve outlet 12 may include a transition portion 22 to which the velocity reduction discharge plate 10 is attached.

Figure 2:
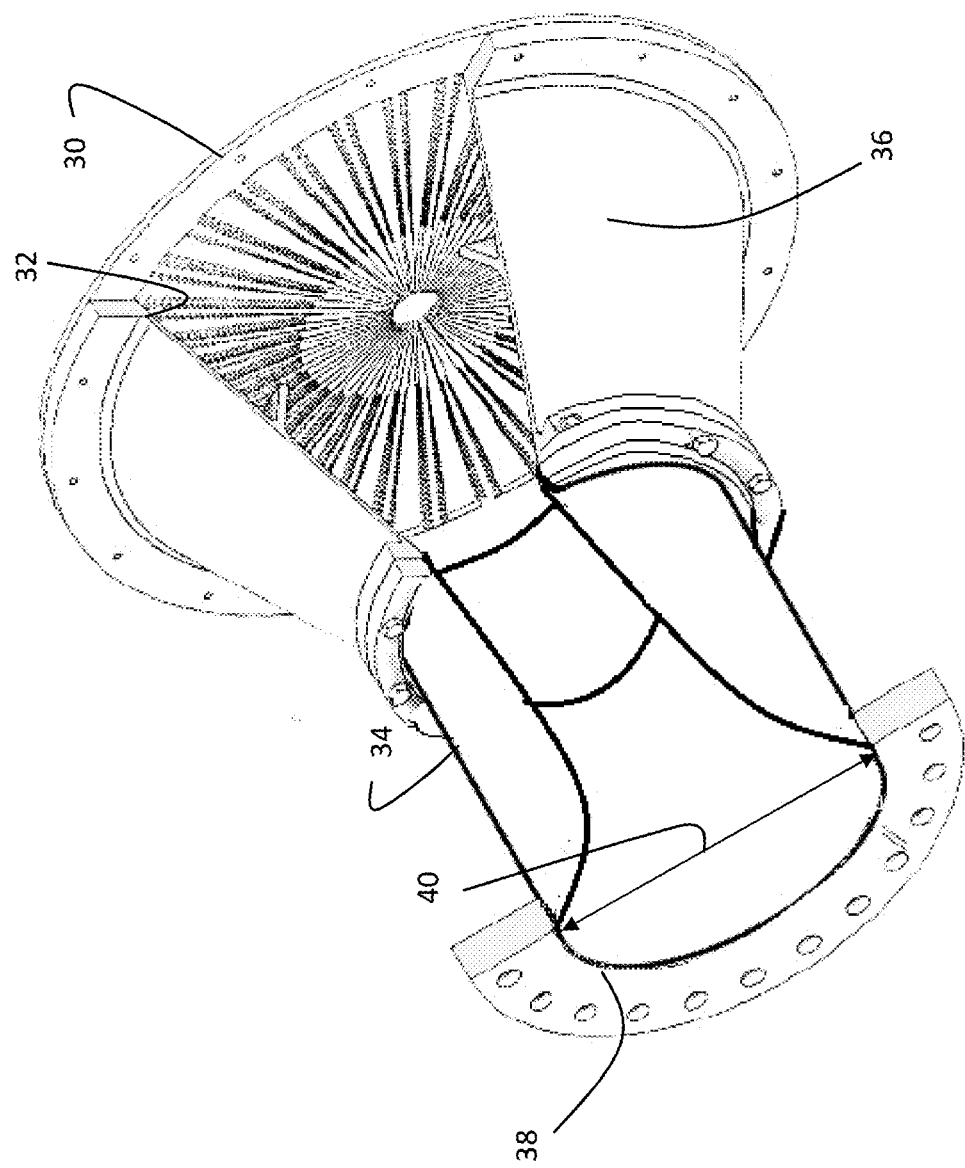
FIG. 2 shows a perspective view of an exemplary discharge comprising a section of pipe with a portion cut-away to show internal features of the discharge and an embodiment of a velocity reduction discharge plate.

FIG. 2 shows an alternate embodiment where a velocity reduction discharge plate 30 is attached to an outlet 32 of a discharge comprising a pipe section 34. The outlet 32 may include a transition portion 36 to which the velocity reduction discharge plate is attached. The discharge 34 may have an inlet 38 spaced from the outlet with fluid flowing through the discharge from the inlet to the outlet. The discharge inlet 38 may have an inlet cross-sectional area 40.

Figure 3:
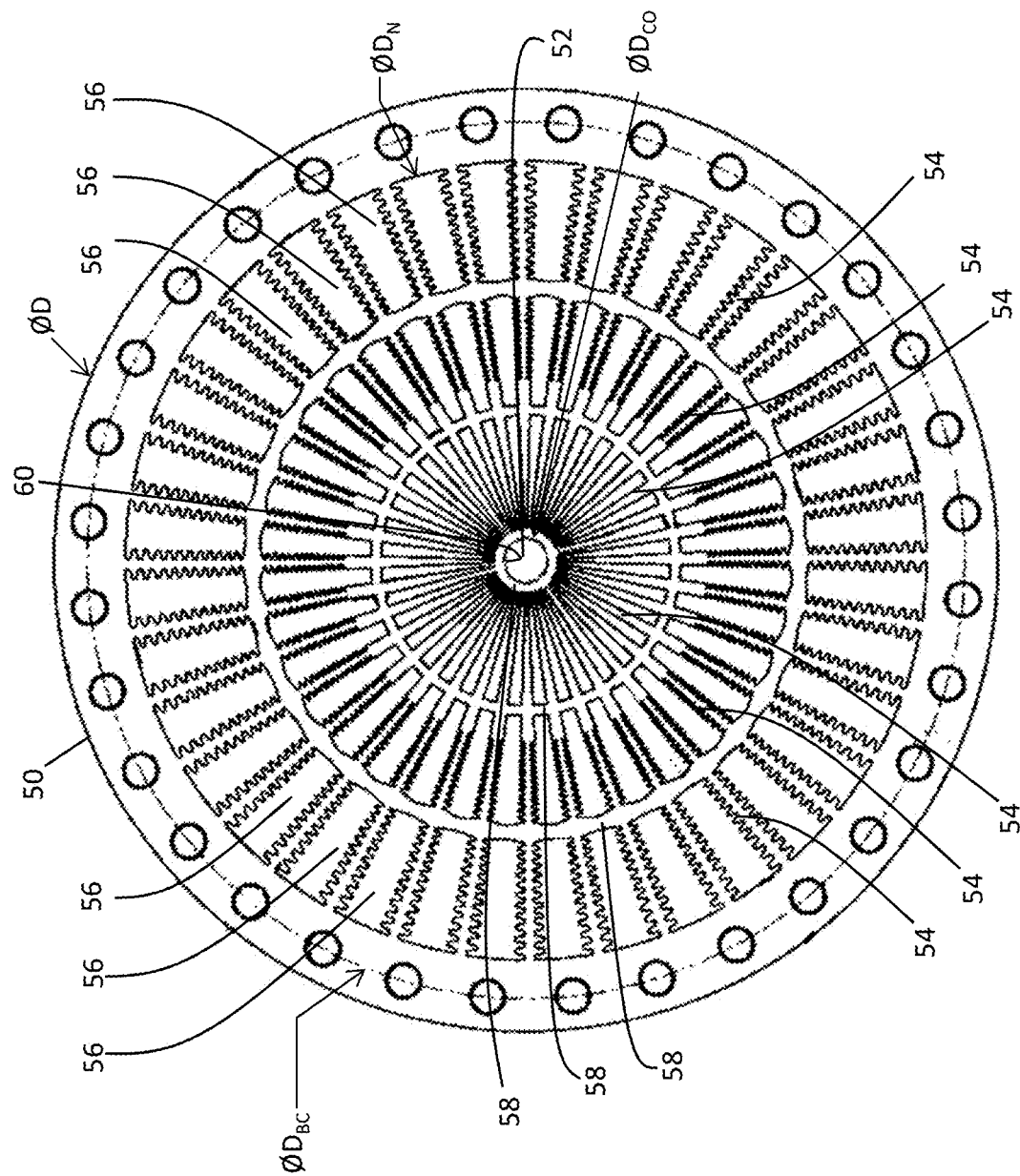
FIG. 3 shows a front view of another embodiment of a velocity reduction discharge plate.
Figure 4:
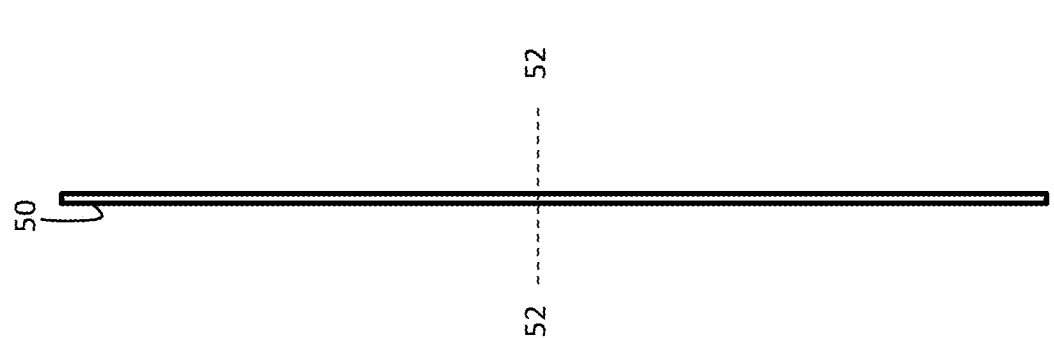
FIG. 4 is a side view of the velocity reduction discharge plate of FIG. 3.

FIG. 3 shows an embodiment of a velocity reduction discharge plate 50. The velocity reduction discharge plate 50 is generally a flat plate defining a plane arranged perpendicular to the direction of flow through the valve or discharge (e.g., pipe section). The direction of flow is parallel to a center axis 52 of the plate. The plate 50 has a plurality of radially extending ribs 54 that are equiangularly spaced about the center axis 52 of the discharge plate. The ribs 54 may be tapered toward the center axis 52 of the plate. Each of the radially extending ribs 54 may terminate before the center axis 52 of the plate. The downstream side of the plate 50 provides a surface over which the atmospheric air will travel to mix with the discharging water. The radial extending ribs 54 define a plurality of radially extending slots 56 between the equiangularly spaced ribs. The ribs 54 may be joined with a bridge structure 58 extending between two or more circumferentially spaced apart radially extending ribs. The bridge structure 58 may be continuous about the center axis of the discharge plate so as to form a ring like structure extending between circumferentially spaced apart radially expanding ribs. As shown in FIG. 3, three ring-like structures 58 are provided. The centermost ring like structure 58 defines a center opening 60 through the plate and joins the tips of the radially innermost, radially extending ribs. The embodiment shown in FIG. 3 shows two additional concentric ring-like structures extending between the radially extending ribs. The bridge/ring-like structures 58 prevent vibration and reduce failure of a rib.

Preferably, there are an equal number of slots 56 and ribs 54. The alternating pattern of ribs and slots at the outer diameter of the plate may allow for radial inflow of atmospheric air along the ribs to infiltrate the water exiting the radial discharge slots. The diameter of the plate and the area and the number of the radially extending slots, and the pressure exiting the slots may be selected in accordance with a desired exit velocity and volume of the aerated flow. Preferably, the radially extending ribs 54 are dimensioned such that the sum of the area of the radially extending slots 56 is at least four times greater than the inlet cross-sectional area 16 (FIG. 1, '16' or FIG. 2, '38').

Figure 5:
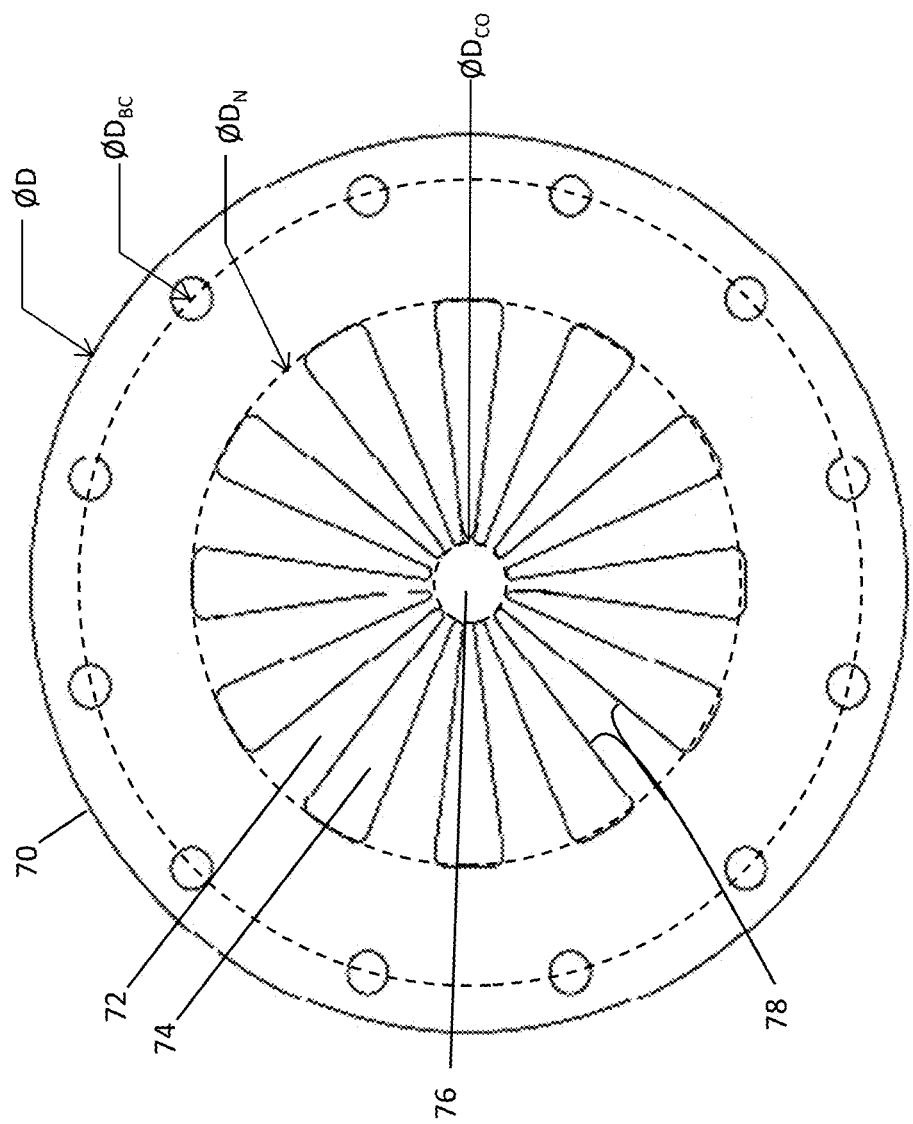
FIG. 5 shows a front view of another embodiment of a velocity reduction discharge plate.
Figure 6:
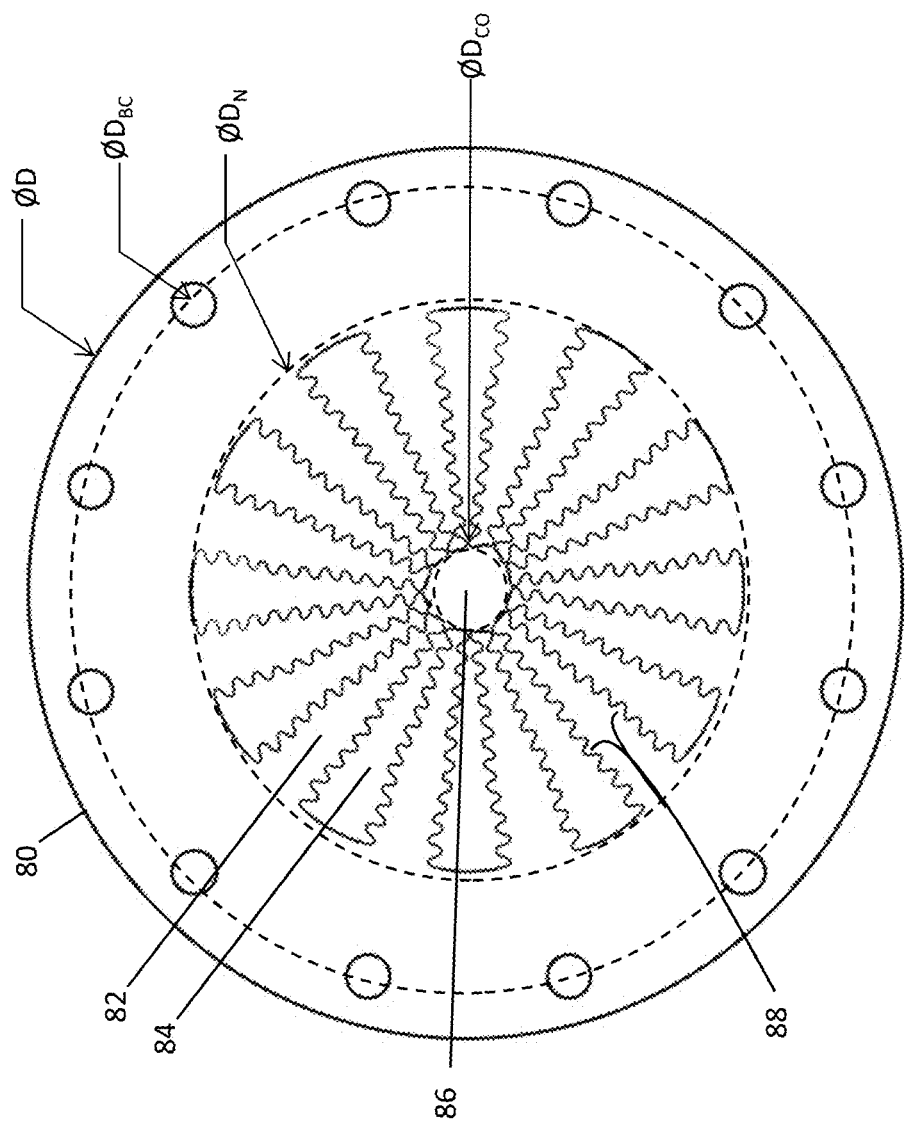
FIG. 6 shows a front view of another embodiment of a velocity reduction discharge plate.

FIGS. 5 and 6 show alternate embodiments of the velocity reduction discharge plates 70, 80. The plate 70 of FIG. 5 has ribs 72 and slots 74 with the same geometry equiangularly spaced about a center axis 76. The radially extending edges 78 of the ribs 72 (and thus the slots 74) may be straight. The plate 80 of FIG. 6 also has ribs 82 and slots 84 with the same geometry equiangularly spaced about a center axis 86. The radially extending edges 88 of the ribs 82 (and thus the slots 84) may be undulating or a wave form, for instance, a sinusoidal type wave. In each case, the ribs and slots may be chosen based upon the size of the outlet discharge, the flow rate, and the desired discharge coefficient.

In one example, a velocity reduction discharge plate similar to that of FIG. 3 may be mounted on the end of a 36 inch pipe. It may have a 46 inch diameter (D) with 36 alternating spaced radial ribs having average width (taking into account waveform) of about 13/16 inches at a nominal 39 inch diameter ($D_N$), and alternating spaced slots having an average width (taking into account waveform) of about 2 inches at a nominal size 39 inch diameter ($D_N$), terminating to generally a point at an innermost rib, which has an outer diameter of about 3¼ inches and an inner diameter of about 2 inches which defines the center opening ($D_{CO}$) near the center axis of the plate. The plate may be bolted on a 42½ inch bolt circle ($D_{BC}$) to a 46 inch pipe flange. Such a plate may produce a 36 inch diameter column of essentially solid aerated flow.

In another example, a velocity reduction discharge plate similar to that of FIG. 5 may be mounted on the end of a 36 inch pipe. It may have a 40 inch diameter (D) with 36 alternating spaced radial ribs, about 1½ inches wide at a nominal size 36 inch diameter ($D_N$), terminating at a width of about ¹³⁄₆₄ inches wide at a 9 inch diameter center opening ($D_{CO}$) near the center axis of the plate. The 36 radial flow slots may be about 1½ inches wide at the 36 inch diameter ($D_N$) with each slot allowing for flow through the plate to mix at the axis of the plate at the 9 inch diameter ($D_{CO}$) center opening. The plate may be bolted on a 38 inch bolt circle ($D_{BC}$) to a 36 inch pipe flange. Such a plate may produce a 36 inch diameter column of essentially solid aerated flow.

In another example, a velocity reduction discharge plate similar to that of FIG. 5 may be mounted to the end of a 12 inch pipe. The velocity reduction discharge plate may have a diameter (D) of 19 inches and have 12 alternating spaced radially extending ribs and slots (24 total). The slots and ribs may have a uniform geometry and may be equiangularly spaced at 15 degrees about the center axis of the plate, terminating at a center opening diameter ($D_{CO}$) of about 2 inches at the center plate with about a ⅛ inch full radius. The 12 radial ribs and the 12 slots may about 1½ inches wide at the nominal 12 inch diameter ($D_N$) with each slot allowing for flow through the plate to mix at the center opening of the plate. The plate may be bolted on a 17 inch bolt circle ($D_{BC}$) to a 12 inch pipe flange.

The velocity reduction discharge plate may be formed from a rigid metallic material, for instance, a 316 stainless steel. The discharge plate may also be formed from an ultra high molecular weight polyethylene with the following properties: (i) a tensile strength of between about 5.6 ksi and about 7.0 ksi; (ii) a yield strength of between about 3.1 ksi and about 4.0 ksi; (iii) an elongation of between about 350% and about 525%; (iv) a maximum service or operational temperature of between 230° F. and 265° F.; (v) a melting temperature of between 257° F. and 280° F.; and (vi) a coefficient of thermal expansion of between 130 and 250 inches/° F. Other polymers with comparable properties may also be used. The plate may be EDM, laser or water jet cut to form the radially extending ribs and slots.

In each plate, the radially extending ribs may be dimensioned such that a sum of the area of the radially extending slots is greater than the valve inlet cross-sectional area (e.g., FIG. 1, '20') or the discharge inlet cross-sectional area (e.g., FIG. 2, '40'). The radially extending ribs may be dimensioned such that the fluid flowing through the plate slots may have a discharge coefficient (Cd) of greater than 0.4.

The fluid flowing from the plate slots may be in a pattern that is circular, spiral, or elliptical depending upon the shape of the slots and the ribs. Additionally, the radially extending edges of the radially extending ribs may have regions that are undulating or wave form, and the undulating regions may be intermittently spaced along the radially extending edges. As shown in the FIGS. 3 and 6, the undulating region extends along the entire radially extending edge. That said, it is not necessary that each radially extending edge of a rib have an undulating region. The wave form pattern may be dispensed with on the innermost ribs. The undulating or wave form pattern of the edges increases the available slot area.

The velocity reduction discharge plate allows for evenly reducing the exit velocity from large throttling valves for instance the axial flow sleeve valve of FIG. 1 or a discharge pipe of FIG. 2. The velocity reduction discharge plate reduces the segmented velocity of free fluid discharge before it impacts downstream objects, which may be another body of water or a ground surface. The velocity reduction discharge plate may reduce the length of travel of the free fluid discharge. The velocity reduction discharge plate may be installed at the outlet of a large diameter control valve (see, e.g., FIG. 1) or at the end of a pipe (see, e.g., FIG. 2) to provide uniform discharge therefrom. Providing the velocity reduction discharge plate with a uniform cross sectional shape and/or area aids in achieving discharge plate velocity reduction. Providing a slot area greater than the inlet cross-sectional area also aids in achieving discharge plate velocity reduction. Incidental aeration of the discharge through the slots in the plate reduces the impact of the flow. The velocity reduction discharge plate combined slot area may be much larger (e.g., at least 4 times greater) in area than the cross-sectional area of the inlet in order to generate a high discharge coefficient (Cd) (above 0.4) and a significant reduction of the exit velocity. Discharge from the velocity reduction discharge plate has a drastically reduced horizontal travel distance relative to the discharge length that would occur without velocity dissipation.

The embodiments were chosen and described in order to best explain the principles of the disclosure and their practical application to thereby enable others skilled in the art to best utilize said principles in various embodiments and with various modifications as are suited to the particular use contemplated. As various other modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A discharge for a fluid system comprising an inlet and an outlet in which a fluid flows from the discharge inlet to the discharge outlet, the discharge inlet having a inlet cross-sectional area, the discharge outlet having a plate, the plate having a plurality of radially extending ribs, the radially extending ribs being equiangularly spaced about a center axis of the plate, the radially extending ribs defining a plurality of radially extending slots between the equiangularly spaced apart ribs, the radially extending ribs being dimensioned such that a sum of an area of all of the radially extending slots is greater than the discharge inlet cross-sectional area, the fluid flowing through the plate slots from the discharge outlet and having a discharge coefficient of greater than 0.4.

2. The discharge of claim 1 further comprising a bridge structure extending between circumferentially spaced apart radially extending ribs.

3. The discharge of claim 2 wherein the bridge structure comprises a ring like structure extending between circumferentially spaced apart radially extending ribs.

4. The discharge of claim 1 wherein the radially extending ribs are dimensioned such that the sum of the area of all of the radially extending slots is at least four times greater than the valve inlet cross-sectional area.

5. The discharge of claim 1 wherein the fluid flowing through the plate slots from the discharge outlet is circular.

6. The discharge of claim 1 wherein the plate has a center opening.

7. The discharge of claim 1 wherein the plate is formed from ultra high molecular weight polyethylene.

8. The discharge of claim 1 wherein the radially extending ribs have radially extending edges with undulating regions.

9. The discharge of claim 1 wherein the discharge comprises a section of pipe.

10. The discharge of claim 1 wherein the discharge comprises a valve outlet.

11. The discharge of claim 10, wherein the plate is mounted to a radially expanding transition portion.

12. A valve comprising an inlet and an outlet with a valve body movable within the valve between an open position in which a fluid flows from the inlet to the outlet, and a closed position in which the fluid is blocked from flowing from the inlet to the outlet, the valve inlet having a inlet cross-sectional area, the valve outlet having a plate, the plate having a plurality of radially extending ribs, the radially extending ribs being equiangularly spaced about a center axis of the plate, the radially extending ribs defining a plurality of radially extending slots between the equiangularly spaced apart ribs, the radially extending ribs being dimensioned such that a sum of an area of all of the radially extending slots is greater than the valve inlet cross-sectional area, the fluid flowing through the plate slots from the outlet of the valve when the valve body is not in the closed position and having a discharge coefficient of greater than 0.4.

13. The valve of claim 12 further comprising a bridge structure extending between circumferentially spaced apart radially extending ribs.

14. The valve of claim 13 wherein the bridge structure comprises a ring like structure extending between circumferentially spaced apart radially extending ribs.

15. The valve of claim 12 wherein the radially extending ribs are dimensioned such that the sum of the area of all of the radially extending slots is at least four times greater than the valve inlet cross-sectional area.

16. The valve of claim 12 wherein the fluid flowing through the plate slots from the outlet of the valve when the valve body is not in the closed position is circular.

17. The valve of claim 12 wherein the plate has a center opening.

18. The valve of claim 12 wherein the plate is formed from ultra high molecular weight polyethylene.

19. The valve of claim 12 wherein the radially extending ribs have radially extending edges with undulating regions.

20. The valve of claim 12 wherein the plate is mounted to a radially expanding transition portion adjacent the valve outlet.

* * * * *